Sept. 16, 1947.     G. E. DATH     2,427,389
HAND BRAKE
Filed Dec. 10, 1945     2 Sheets-Sheet 1
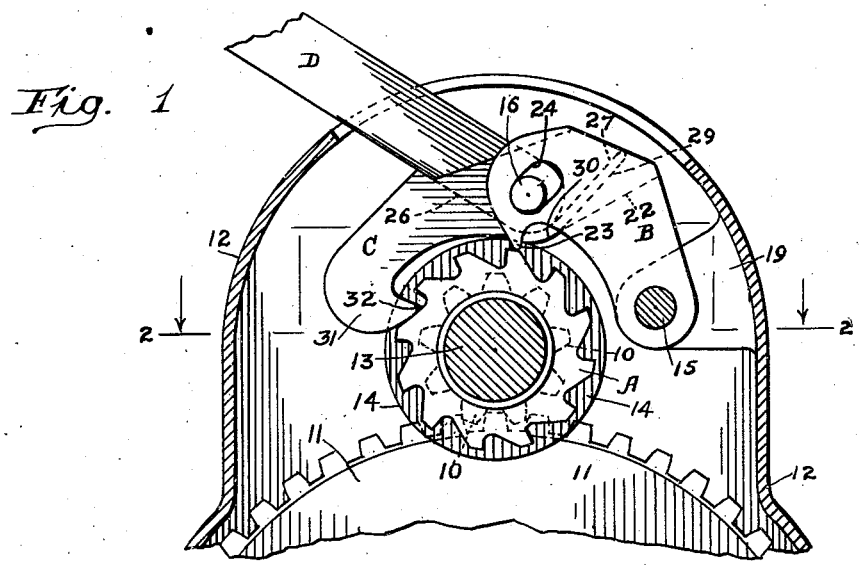
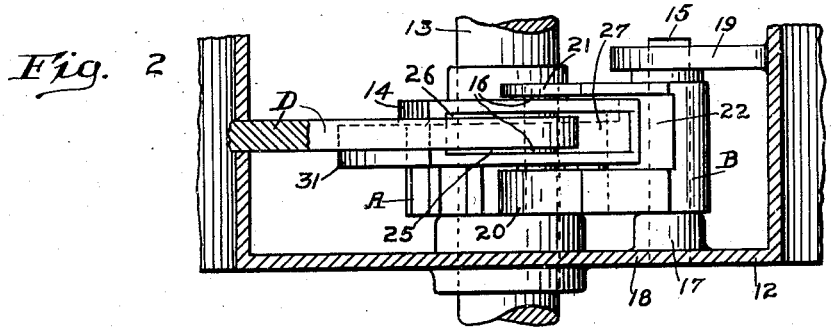
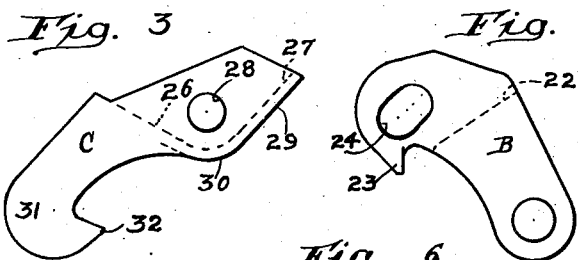
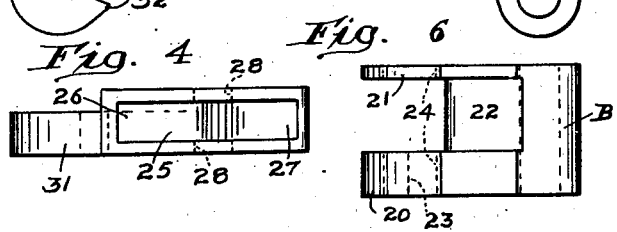
Inventor:
George E. Dath.
By Henry Fuchs.
Atty.

Sept. 16, 1947.  G. E. DATH  2,427,389
HAND BRAKE
Filed Dec. 10, 1945  2 Sheets-Sheet 2
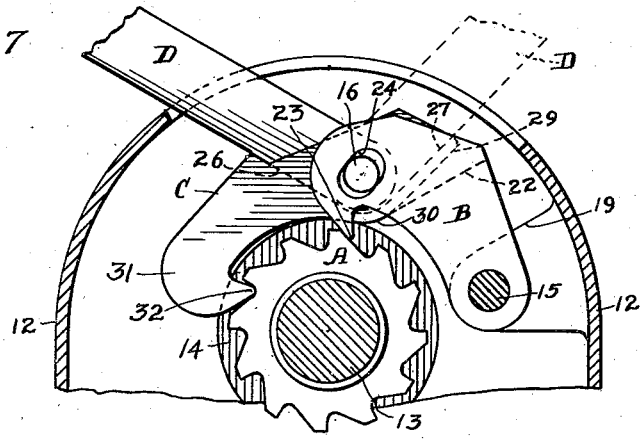
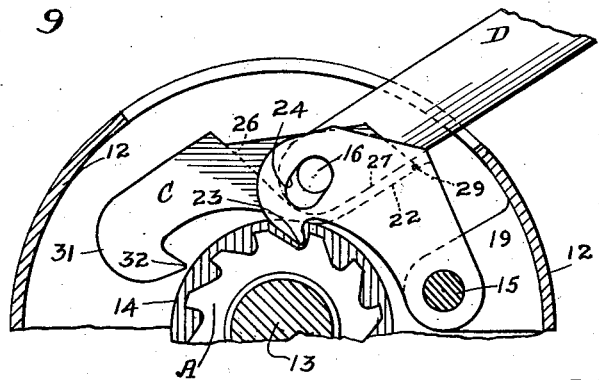
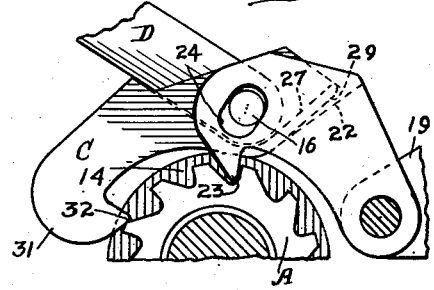
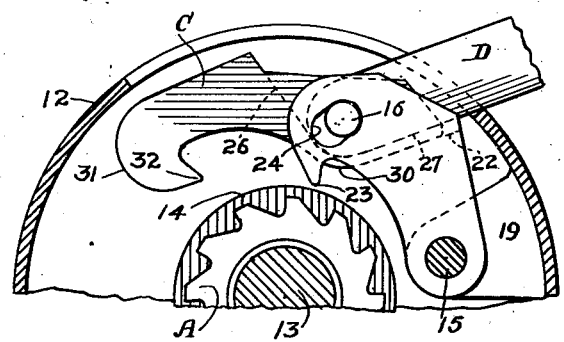
Inventor:
George E. Dath.
By Henry Fuchs
Atty.

Patented Sept. 16, 1947

2,427,389

UNITED STATES PATENT OFFICE 2,427,389

HAND BRAKE

George E. Dath, Mokena, Ill., assignor to W. H. Miner, Inc., Chicago, Ill., a corporation of Delaware Application December 10, 1945, Serial No. 633,923

12 Claims. (Cl. 188—81.1)

1

This invention relates to improvements in hand brakes for railway cars.

One object of the invention is to provide a hand brake mechanism of the power multiplying type, especially adapted for railway cars, comprising a ratchet and cooperating locking means for holding the mechanism against movement in brake releasing direction, wherein the locking means provides for relative fine ratcheting adjustment in applying the brakes, thus preventing excessive backing up of the ratchet before it is positively locked against movement in releasing direction, thereby materially increasing the effectiveness of the brake mechanism.

A further object of the invention is to provide a brake mechanism of the character indicated wherein the locking means for the ratchet comprises a set of two locking dogs or pawls having staggered engagement with the teeth of the ratchet wheel, whereby the ratchet may be effectively locked against rotation in releasing direction and the fineness of the locking adjustment is increased two fold over that provided by the usual holding means comprising a single dog or pawl.

A still further object of the invention is to provide a ratchet mechanism for rotary hand brakes, wherein the ratchet mechanism comprises a rotary ratchet wheel and a set of two pivoted holding dogs having staggered engagement with the ratchet teeth of the wheel to provide for relatively fine holding adjustment, and wherein means is provided for releasing both dogs from engagement with the ratchet wheel through the operation of a single actuating lever.

Yet another object of the invention is to provide a mechanism as set forth in the preceding paragraph wherein the locking dogs may be forcibly engaged with the ratchet wheel by operation of the actuating lever in a direction reverse to the direction of movement thereof in releasing the dogs from the ratchet wheel.

A further object of the invention is to provide a hand brake mechanism, as hereinbefore set forth, wherein the weight of the actuating lever, for controlling the movement of the locking dogs to and from operative position, in one position thereof, yieldingly holds one of said dogs engaged with the ratchet wheel, and the weight thereof in another position effects automatic release of both dogs or pawls upon slight tightening of the brake mechanism by means of the usual actuating hand wheel.

Other objects of the invention will more clearly appear from the description and claims hereinafter following.

2

In the drawings forming a part of this specification, Figure 1 is a front elevational view, partly in transverse vertical section, of the upper portion of a gear operated hand brake mechanism, illustrating my improvements in connection therewith, showing the parts of the mechanism in ratcheting action. Figure 2 is a horizontal sectional view, corresponding substantially to the line 2—2 of Figure 1, showing certain parts in plan. Figure 3 is a side elevational view of one of the set of two locking dogs of my improved mechanism. Figure 4 is a top plan view of Figure 3. Figure 5 is a side elevational view of the other locking dog of said set. Figure 6 is a top plan view of Figure 5. Figures 7, 8, 9, and 10 are views similar to Figure 1, partly broken away, showing the parts of the mechanism in various operating positions, Figure 7 showing the ratchet wheel slightly advanced from the position shown in Figure 1, with one of the set of dogs in locking position, Figure 8 showing the ratchet wheel still further advanced with the other dog of said set in locking position, Figure 9 showing the operating lever for the dogs thrown to position to effect automatic release of the dogs, and Figure 10 showing the dogs fully released.

As illustrated in the drawings, my improvements are employed in connection with a well-known type of power multiplying gear brake, employing the usual brake drum on which the chain is wound, the drum being rotated by a driving pinion 10 actuated by the hand wheel of the brakes, not shown, and meshing with the gear 11, which is rotatable with the winding drum. The parts of the brake mechanism are contained in the usual housing, which is indicated by 12.

My improved hand brake mechanism proper comprises broadly a ratchet wheel A rotatable with the driving pinion of the power multiplying gear brake; a set of two locking dogs or pawls B and C cooperating with the ratchet wheel; and an operating or trip lever D for actuating the dogs B and C.

The ratchet wheel A is of the usual type and is fixed to the shaft 13 which also has the pinion 10 fixed thereto and is actuated by the usual hand wheel, not shown, which is located on the shaft exteriorly to the housing. The shaft 13 has its opposite ends journaled in the usual manner in the front and rear walls of the housing. On the rear side thereof, as viewed in Figures 1 and 2, the ratchet wheel A is provided with an annular flange 14 which protrudes outwardly beyond the outer ends of the teeth of said wheel and forms a guide or support for the dog C, as hereinafter pointed out.

The locking dogs or pawls B and C are supported above the ratchet wheel, the dog B being pivoted at its inner end on a pin 15 and the dog C being pivotally connected at its inner end to the outer end of the dog B by a pin 16. The pivot pin 15 of the dog B is supported at its outer end in an inwardly projecting boss 17 on the front wall 18 of the housing 12 and at its inner end in a supporting bracket arm 19 projecting inwardly from the side wall of the housing 12. The dog B is forked at its outer or front end, thereby providing laterally spaced arms 20 and 21, the arm 20 being of considerable greater thickness than the arm 21, as clearly shown in Figure 6. The solid rear portion of the dog B provides a flat, inclined abutment surface 22 between said arms at the inner ends thereof. At its outer end, the arm 20 is provided with a tooth 23 which projects beyond the corresponding outer end of the arm 21 and engages the ratchet teeth of the wheel A. The arms 20 and 21 of the dog B are provided with transversely aligned, relatively short slots 24—24 which accommodate the pivot pin 16 of the pawl C, the slots 24—24 being curved lengthwise, as shown, and being concentric with the pin 16. The pin 16 loosely fits the slots 24—24 and allows pivotal or swinging movement of the dog C with respect to the dog B and upward and downward swinging movement of the dog B on its pivot 15 with respect to the pivot 16 of the dog C, said movement being within the limits of the lengths of the slots 24—24.

The dog C is pivotally supported at its rear end between the arms 20 and 21 of the dog B by means of the pin 16 which extends through the slots 24—24 of these arms and through the rear end of the dog C. An upwardly opening pocket 25 is provided at the rear end portion of the dog C, said pocket having upwardly diverging, front and rear walls 26 and 27 together forming a V-shaped bottom wall, as most clearly shown in Figure 3. The pocket 25 accommodates the lower end of the actuating or controlling lever D, which is pivotally supported on the pivot 16 which extends through aligned openings 28—28 in the side walls of the pocket 25 and a transverse pivot pin receiving opening at the lower end of the lever D. As will be evident upon reference to Figure 1, the lever D, which is provided with the usual manipulating hand grip portion at its outer end, not shown, is swingable to and fro on the pin 16 and has its swinging movement with respect to the dog C limited by engagement with the respective walls 26 and 27 of the pocket 25. As clearly shown in Figures 1, 7, 8, 9, and 10, the swinging pivotal movement of the dog C with respect to the dog B, in right hand direction, as viewed in said figures, is limited by engagement of the flat outer rear face 29 of the pivoted end of the dog C with the abutment surface or face 22 of the dog B. The lower side of the dog C presents a rounded surface 30 at the pivoted end thereof, which rests on the annular flange 14 of the ratchet wheel A to support the dog C at its inner end and prevent downward buckling of the dogs B and C at the pivotal connection therebetween. At the outer end, the dog C is provided with a finger 31 which projects from the pocketed read end portion thereof and has a tooth 32 at its outer end cooperating with the teeth of the ratchet wheel A. As shown most clearly in Figures 2 and 4, the toothed finger portion of the dog C is of lesser width than the rear portion of said dog and is offset to clear the flange 14 of the ratchet wheel A and permit engagement of the tooth 32 of said dog with the teeth of the ratchet wheel. The width of the ratchet wheel A and the teeth thereof is such that the teeth are engaged by the teeth of both dogs B and C, which operate side by side.

The parts are so designed that the teeth 23 and 32 of the dogs B and C have staggered engagement with the ratchet teeth of the wheel A, that is, when one of the two teeth 23 or 32 is in holding engagement with one of the teeth of the ratchet wheel, the other of said two teeth will be midway beween two adjacent teeth of said wheel, as shown in Figures 7 and 8 respectively, so that the locking means formed by the two dogs B and C is capable of arresting backing up movement of the ratchet wheel at intervals corresponding in number to double the number of the teeth employed on the ratchet wheel, thereby providing for relatively finer adjustment in holding the brakes against release without any reduction in size, ruggedness, or strength of the individual teeth of said wheel. As will be evident with the construction described, I am enabled to obtain relatively fine locking adjustment and all attendant advantages thereof without in any way weakening the strength of the ratchet wheel which would necessarily occur through reduction in size of the teeth thereof if the number of teeth were increased to produce the same result in connection with the usual single locking dog.

The operation of my improved ratchet hand brake mechanism is as follows: As the brakes are being applied by rotation of the shaft 13 and the ratchet wheel A in clockwise direction, as viewed in Figures 1, 7, and 8, the dogs B and C ratchet over the teeth of the wheel, the dog C being yieldingly urged against the teeth of the wheel by the added weight of the lever D, which, in the position shown in said figures, bears on the abutment wall 26 of the pocket 25 of the dog C, and the dog B being yieldingly held in engagement with the ratchet wheel by its weight. In this ratcheting action, the required upward movement of the dog B with respect to the dog C is permitted by the lost motion therebetween provided by the slots 24—24 of the dog B. As the dogs B and C ratchet over the teeth of the wheel A, they alternately come into locking position with respect to said teeth, as shown respectively in Figures 7 and 8. Assuming that the brake has been set with the tooth of the dog C fully engaged with the ratchet wheel A, as shown in Figure 7, and it is desired to release the brakes, the attendant swings the lever D to the right, thereby forcibly withdrawing both dogs B and C out of engagement with the ratchet wheel, as shown in Figure 10, the dog C being swung on its pivot 16 by engagement of the lever D with the abutment wall 27 of the pocket of said pawl, until the flat rear face 29 comes into engagement with the abutment face 22 of the dog B, compelling the dog B to swing outwardly away from the ratchet wheel in unison with the dog C to the completely disengaged position shown in Figure 10. As will be evident, the weight of the lever D holds both dogs disengaged until the lever is thrown back manually to the position shown in Figures 1, 7, and 8, bearing on the wall 26 of the pocket 25 of the dog C. Throwing of the lever to this last named position forcibly engages the dog C with the ratchet wheel. In the event that the ratchet wheel comes to rest in a position with the teeth thereof so disposed that the dog C does not register with the opening between two adjacent teeth, for example, as shown in Figure 8, the dog B will drop into engaging position through the action of gravity, and as the ratchet wheel is rotated in brake tightening direction, that is, clockwise, the dog C will drop into engagement with the corresponding tooth of the ratchet wheel, being urged into such engagement by the force exerted by the weight of the lever D. Assuming that the brake has been set with the tooth of the dog B fully engaged with the ratchet wheel, as shown in Figure 8, and it is desired to release the brakes, the operation of withdrawing the dogs from engagement with the ratchet wheel is the same as that hereinbefore described, the dog C which loosely rests on the ratchet wheel, as shown in Figure 8, being first rocked to the position shown in Figure 9, and, upon contact with the abutment face 22 of the dog B, rocking the latter on its pivot to move both dogs to the completely released position shown in Figure 10.

As will be evident, when the brake is being tightened by rotation of the ratchet wheel A, the dogs B and C, being staggered with reference to the teeth of the ratchet wheel, will alternately drop into holding engagement with said teeth, thus effectively locking the ratchet wheel against reverse rotation at intervals of advance of said wheel, corresponding to one-half of the amount of rotation thereof required to advance the same one tooth, thereby permitting the brakeman to tightly set the brakes even when the resistance encountered is too great to allow the ratchet wheel to be advanced an amount corresponding to one tooth thereof.

In addition to providing for forcible manual disengagement of the dog C from the ratchet wheel by operation of the lever D, automatic disengagement thereof and withdrawal of both dogs is accomplished in the following manner: With the ratchet wheel locked against reverse rotation, as shown in Figure 7, the lever D is thrown from the full to the dotted line position shown in said figure, where it rests against the wall 27 of the pocket 25 of the dog C and exerts pressure on said dog, tending to withdraw the same. Upon slight rotation of the ratchet wheel in direction to apply the brakes, the pressure on the tooth of the dog C is relieved, thus freeing the same to be automatically withdrawn from engagement with the ratchet wheel by the weight of the lever D. During withdrawal of the dog C by the weight of the moving lever D, the dog C swings on its pivot 16 until it engages the abutment surface or face 22 of the dog B, causing the latter to swing on its pivot 15 in unison with the dog C to effect complete disengagement of both of said dogs, as illustrated in Figure 10.

I claim:

1. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with the teeth of said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of the first named dog away from said ratchet wheel in unison with the second named dog; and means for disengaging said dogs from the ratchet wheel comprising a lever rotatably mounted on said second named dog and having shouldered engagement with said second named dog to effect movement thereof away from said ratchet wheel.

2. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with the teeth of said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of the first named dog away from said ratchet wheel in unison with the second named dog, said dogs having the teeth thereof staggered with respect to the teeth of the ratchet wheel; and means for disengaging said dogs from the ratchet wheel comprising a lever rotatably mounted on said second named dog and having shouldered engagement with said second named dog to effect movement thereof away from said ratchet wheel.

3. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with the teeth of said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of the first named dog away from said ratchet wheel in unison with the second named dog; and means for disengaging said dogs from the ratchet wheel comprising a lever rotatably supported on the pivot of said second named dog and having shouldered engagement with said second named dog to effect movement thereof away from said ratchet wheel.

4. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with the teeth of said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of the first named dog away from said ratchet wheel in unison with the second named dog, said dogs having the teeth thereof staggered with respect to the teeth of the ratchet wheel; and means for disengaging said dogs from the ratchet wheel comprising a lever rotatably supported on the pivot of said second named dog and having shouldered engagement with said second named dog to effect movement thereof away from said ratchet wheel.

5. In a hand brake mechanism, the combination with a member adapted to be rotated to effect tightening of the brake; of a ratchet wheel rotatable with said member; said wheel having a plurality of teeth; a locking dog having ratcheting engagement with said wheel, said dog being pivoted at one end and having a tooth at the other end engageable with said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of said first named dog away from said ratchet wheel in unison with said second named dog; and a trip lever rotatably mounted on said second named dog and swingable to two different positions, said lever having shouldered engagement with said second named dog in one position of said lever to force said dog against the ratchet wheel, and having shouldered engagement with said second named dog in the other of said two positions to effect movement of said second named dog away from the ratchet wheel.

6. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of said first named dog away from said ratchet wheel in unison with said second named dog, said dogs having the teeth thereof staggered with respect to the teeth of the ratchet wheel; and a trip lever rotatably mounted on said second named dog and swingable to two different positions, said lever having shouldered engagement with said second named dog in one position of said lever to force said dog against the ratchet wheel, and having shouldered engagement with said second named dog in the other of said two positions to effect movement of said second named dog away from the ratchet wheel.

7. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of said first named dog away from said ratchet wheel in unison with said second named dog; and a trip lever rotatably supported on the pivot of said second named dog and swingable to two different positions, said lever having shouldered engagement with said second named dog in one position of said lever to force said dog against the ratchet wheel, and having shouldered engagement with said second named dog in the other of said two positions to effect movement of said second named dog away from the ratchet wheel.

8. In a hand brake mechanism, the combination with a member adapted to be rotated to effect tightening of the brake; of a ratchet wheel rotatable with said member, said wheel having a plurality of teeth; a locking dog having ratcheting engagement with said wheel, said dog being pivoted at one end and having a tooth at the other end engageable with said ratchet wheel; a second dog engageable with said ratchet wheel, said last named dog being pivoted at one end to the toothed end of said first named dog and having a tooth at the other end engageable with said ratchet wheel, said second named dog having shouldered engagement with the first named dog to effect movement of said first named dog away from said ratchet wheel in unison with said second named dog, said dogs having the teeth thereof staggered with respect to the teeth of the ratchet wheel; and a trip lever rotatably supported on the pivot of said second named dog and swingable to two different positions, said lever having shouldered engagement with said second named dog in one position of said lever to force said dog against the ratchet wheel, and having shouldered engagement with said second named dog in the other of said two positions to effect movement of said second named dog away from the ratchet wheel.

9. In a hand brake mechanism, the combination with a member adapted to be rotated to effect tightening of the brake; of a ratchet wheel rotatable with said member, said wheel having a plurality of teeth; a locking dog above said ratchet wheel having ratcheting engagement therewith, said dog being pivoted at one end and having a tooth at its other end engageable with the teeth of the ratchet wheel; a second dog pivotally connected at one of its ends to said first named dog, said second named dog having a tooth at its other end engageable with the teeth of said ratchet wheel, said second named dog having shouldered engagement with the first named dog to effect upward swinging movement of said first named dog away from said ratchet wheel in unison with said second named dog; an upstanding trip lever pivotally supported at its lower end on said second named dog, said lever being swingable to opposite sides of a vertical position thereof, said lever having shouldered engagement with said second named dog when swung to one side of said vertical position to force said dog against the ratchet wheel, and having shouldered engagement with said second named dog when swung to the other side of said vertical position to withdraw said dog from engagement with said ratchet wheel.

10. In a hand brake mechanism, the combination with a member adapted to be rotated to effect tightening of the brake; of a ratchet wheel rotatable with said member, said wheel having a plurality of teeth; a locking dog above said ratchet wheel having ratcheting engagement therewith, said dog being pivoted at one end and having a tooth at its other end engageable with the teeth of the ratchet wheel; a second dog pivotally connected at one of its ends to said first named dog, said second named dog having a tooth at its other end engageable with the teeth of said ratchet wheel, said second named dog having shouldered engagement with the first named dog to effect upward swinging movement of said first named dog away from said ratchet wheel in unison with said second named dog, said dogs having the teeth thereof staggered with respect to the teeth of the ratchet wheel; an upstanding trip lever pivotally supported at its lower end on said second named dog, said lever being swingable to opposite sides of a vertical position thereof, said lever having shouldered engagement with said second named dog when swung to one side of said vertical position to force said dog against the ratchet wheel, and having shouldered engagement with said second named dog when swung to the other side of said vertical position to withdraw said dog from engagement with said ratchet wheel.

11. In a hand brake mechanism, the combination with a member adapted to be rotated to effect tightening of the brake; of a ratchet wheel rotatable with said member, said wheel having a plurality of teeth; a locking dog above said ratchet wheel having ratcheting engagement therewith, said dog being pivoted at one end and having a tooth at its other end engageable with the teeth of the ratchet wheel; a second dog pivotally connected at one of its ends to said first named dog, said second named dog having a tooth at its other end engageable with the teeth of said ratchet wheel, said second named dog having shouldered engagement with the first named dog to effect upward swinging movement of said first named dog away from said ratchet wheel in unison with said second named dog, said dogs having the teeth thereof staggered with respect to the teeth of said ratchet wheel; an upstanding trip lever rotatably supported at its lower end on the pivot of said second named dog, said lever being swingable to opposite sides of a vertical position thereof, said lever having shouldered engagement with said second named dog when swung to one side of said vertical position to force said dog against the ratchet wheel, and having shouldered engagement with said second named dog when swung to the other side of said vertical position to withdraw said dog from engagement with said ratchet wheel.

12. In a hand brake mechanism, the combination with a member adapted to be rotated to effect tightening of the brake; of a ratchet wheel rotatable with said member, said wheel having a plurality of teeth; a locking dog above said ratchet wheel having ratcheting engagement therewith, said dog being pivoted at one end and having a tooth at its other end engageable with the teeth of the ratchet wheel; a second dog pivotally connected at one of its ends to said first named dog, said second named dog having a tooth at its other end engageable with the teeth of said ratchet wheel, said second named dog having shouldered engagement with the first named dog to effect upward swinging movement of said first named dog away from said ratchet wheel in unison with said second named dog; an upstanding trip lever rotatably supported at its lower end on the pivot of said second named dog, said lever being swingable to opposite sides of a vertical position thereof, said lever having shouldered engagement with said second named dog when swung to one side of said vertical position to force said dog against the ratchet wheel, and having shouldered engagement with said second named dog when swung to the other side of said vertical position to withdraw said dog from engagement with said ratchet wheel.

GEORGE E. DATH.

REFERENCES CITED

The following references are of record in the file of this patent:

UNITED STATES PATENTS

| Number | Name | Date |
| --- | --- | --- |
| 1,012,053 | Basley | Dec. 19, 1911 |
| 2,179,674 | Stolpe | Nov. 14, 1939 |